United States Patent [19]

Radlove

[11] 4,379,174
[45] Apr. 5, 1983

[54] DIETETIC CAKE MIX

[75] Inventor: Sol B. Radlove, Sunrise, Fla.

[73] Assignee: Batterlite-Whitlock Incorporated, Springfield, Ill.

[21] Appl. No.: 278,197

[22] Filed: Jun. 29, 1981

Related U.S. Application Data

[63] Continuation-in-part of Ser. No. 73,106, Sep. 6, 1979, Pat. No. 4,277,504, and a continuation-in-part of Ser. No. 818,531, Jul. 25, 1977, Pat. No. 4,185,127.

[51] Int. Cl.³ ................................................ A21D 10/00
[52] U.S. Cl. .................................... 426/554; 426/62; 426/555; 426/658; 426/804; 426/653
[58] Field of Search .............. 426/554, 555, 653, 654, 426/650, 658, 62, 562, 804

[56] References Cited

U.S. PATENT DOCUMENTS

| | | | |
|---|---|---|---|
| 2,975,059 | 3/1961 | Andrews | 426/96 |
| 3,144,341 | 8/1964 | Thompson | 426/653 |
| 3,158,487 | 11/1964 | Reid | 426/653 |
| 3,170,795 | 2/1965 | Andre | 426/554 |
| 3,227,559 | 1/1966 | Radlove | 426/611 |
| 3,236,658 | 2/1966 | Little | 426/567 |
| 3,574,637 | 4/1971 | Andre | 426/554 |
| 3,625,701 | 12/1971 | Walon | 426/658 |
| 3,625,711 | 12/1971 | Eisenstadt | 426/548 |
| 3,651,221 | 3/1972 | Conrad et al. | 424/180 |
| 3,658,553 | 4/1972 | Radlove | 426/554 |
| 3,703,440 | 11/1972 | Okada et al. | 195/31 R |
| 3,706,575 | 12/1972 | Broadhead | 426/554 |
| 3,741,776 | 6/1973 | Mitsuhashi et al. | 426/599 |
| 3,743,518 | 7/1973 | Eisenstadt | 426/548 |
| 3,875,311 | 4/1975 | Eisenstadt | 426/548 |
| 3,928,647 | 12/1975 | Gupta | 426/554 |
| 3,973,050 | 8/1976 | Hayashibara et al. | 426/552 |
| 4,250,202 | 2/1981 | Hartnett | 426/553 |

FOREIGN PATENT DOCUMENTS 563621  9/1959  Canada.

OTHER PUBLICATIONS

"Fructose Fruit Sugar", Published by Finnish Sugar Co., Ltd.
Doty et al., "Crystalline Fructose: Use as a Food Ingredient Expected to Increase, " Food Technology, Nov. 1975, pp. 35–38.
Doty, *Cereal Foods World*, vol. 21, No. 2, Feb. 1976, pp. 62–63.
Volpe, *Bakery*, May 1977, p. 128.
"Now You Can Have Better Flavor, Higher Yield and Lower Production Costs . . . From a Single Ingredient", Amoco Foods Co., Chicago, Ill. 60601.

*Primary Examiner*—Raymond N. Jones
*Assistant Examiner*—Elizabeth J. Curtin
*Attorney, Agent, or Firm*—Gerald A. Mathews

[57] ABSTRACT

A dietetic cake mix which is adapted to be sweetened with corn syrup, especially dextrose syrup or either 42% or 55% high fructose corn syrup. The mix is free of artificial sweeteners, egg yolks and ordinary sugar, thus making it suitable for consumption by diabetics and coronary care patients. The dextrose syrup or 42% or 55% high fructose corn syrup is combined with a unique blend of other ingredients, including flour, emulsifiers and baking powder, preferably including glucono-delta-lactone as its acidic component, to produce a cake having good volume, texture, flavor, moisture, mouth-feel and sweetness as well as acceptable shelf life.

11 Claims, No Drawings

DIETETIC CAKE MIX

This is a continuation-in-part of application Ser. No. 073,106, filed Sept. 6, 1979, now U.S. Pat. No. 4,277.504, and a continuation-in-part of application Ser. No. 818,531, filed July 25, 1977, now U.S. Pat. No. 4,185,127.

BACKGROUND OF THE INVENTION

This invention relates generally to a flour based dietetic cake mix, and specifically to a dietetic cake mix which is especially suited to be combined with a corn derived sweetener, particularly dextrose syrup or 42% and 55% high fructose corn syrup as the sweetener. Further, the invention relates to a premix product which can be purchased in bulk quantities by commercial and institutional bakers to be combined with the corn derived syrup. It is free of ordinary sugar, egg yolks and artificial sweeteners.

Dietetic and, especially, diabetic baked dessert foods, such as cake, chronically suffer from poor volume, texture, mouth-feel, taste, and, most notably, from insufficient natural sweetness. As used here, the word "dietetic" refers to foods for those people on a special diet, such as low cholesterol and sugar (sucrose) free diets. Further, "dietetic" means having one or more of the following characteristics or properties in a cake mix: (1) either the complete substitution of liquid shortening for hydrogenated shortening, or the lessening of the amount of hydrogenated shortening; (2) the use of egg whites and not egg yolks; (3) the substitution of fructose, especially in the form of 42% and 55% high fructose corn syrup, or dextrose in the form of high dextrose equivalent corn syrup, for sucrose.

Sweeteners, including ordinary sugar (sucrose), saccharin, cyclamates, and sorbitol, and their combinations, all have some sort of undesirable attributes including after-taste, objectionable taste, side effects and potential harm to human health. For example, for some people saccharin has an unpleasant bitter metallic aftertaste, and it has recently been proposed to be banned as a carcinogen. Sorbitol has only about one-half the sweetness of sucrose, but when consumed in moderate quantities can cause some people to suffer gastric discomfort and diarrhea. Sucrose must be used in such large amounts in order to impart the desired degree of sweetness that the product contains too many calories to make it suitable for consumption by persons on a diet. Further, sucrose is quickly metabolized, requiring insulin, which makes it generally unsuitable for diabetic use.

It has not to my knowledge been heretofore possible to provide an acceptable degree of sweetness in a dietetic cake without using non-nutritive artificial sweeteners, such as saccharin and cyclamates. My U.S. Pat. No. 3,658,553 describes the use of a combination of sorbitol (a nutritive sweetener) and saccharin in a dietary dry cake mix.

In recent years, some nutritionists and the U.S. Food and Drug Administration have from time to time expressed concern about the use of saccharin and cyclamates as food sweeteners. Such concern by the FDA has resulted in cyclamates and saccharin being banned, although there has been considerable debate over the medical basis for this action. The major concerns expressed about saccharin and cyclamates is whether they are detrimental to human health if consumed in large quantities over a long time.

In contrast to saccharin and cyclamates, fructose is a naturally occurring nutritive sweetener. It is a carbohydrate and has the same amount of calories per unit weight as another natural sugar, sucrose. Accordingly, it is believed to be as safe for human consumption as any natural food. Fructose tastes like ordinary common sugar, but is approximately 50 percent sweeter than sucrose and 150% sweeter than sorbitol. In fact, fructose is the sweetest natural sugar known. This relatively high level of sweetness allows less fructose to be required in many products with a corresponding reduction in sugar derived calories of about 20–80 percent. However, this is not true in products subjected to heat as fructose rearranges into a less sweet form when heated. Fructose varies in sweetness, depending on temperature, time, acidity and use. In heated products, fructose is generally in a less sweet form and in unheated products, it is in a sweeter form.

Compared to common sugar (sucrose), fructose enters the blood stream at a relatively slow rate. In addition, fructose absorption, unlike that of either glucose or galactose, does not stimulate either glucagon from the gut or insulin from the pancreas. These and related properties are believed to enable fructose to be utilized in the body metabolism without having an adverse effect on glucose metabolism by which blood sugar is assimulated and metabolized into the body utilizing insulin. For these and other reasons which are not fully understood, studies have shown that fructose can be used in moderate amounts in the diet of persons having mild or well balanced diabetes without deleterious effects.

The relatively slow rate that fructose is absorbed and metabolized in the liver enhances the desirability of its use by the persons on a special diet since glucose is thereby released into the blood stream slowly and more evenly over an extended period of time to naturally control hunger.

Finally, because fructose is sweeter than common sugar, in some applications it can be used in smaller, more moderate, quantities in diets to provide the desired degree of sweetness with a corresponding reduction in the amount of sugar derived calories.

Fructose is not only sweeter than sucrose, but, in the form of high fructose corn syrup (HFCS), is currently about half as expensive as crystalline sucrose. For this reason, the baking industry has for years been trying to substitute HFCS for sucrose but, until now, has been unable to produce a commercially acceptable high rise cake. In addition, there has been pressure from consumer groups who are concerned over the steadily increasing consumption of sucrose in the United States, which is expected to be about 135 pounds per person this year. There is a statistical correlation between sucrose consumption and overweight. Since overweight is linked with so many human diseases, including diabetes, coronary disease, strokes and hardening of the arteries, there is a long felt need for the effective use of HFCS in baked products, especially high rise cakes.

Heretofore, as described in my U.S. Pat. No. 4,185,127, my dietetic cake mixes utilized fructose in its crystalline form. While this is not a problem of great magnitude in prepackaged cake mixes for the retail market, crystalline fructose is expensive, and difficult to obtain by commercial and institutional bakers and difficult to use to produce an acceptable cake when it is available. Further, with energy costs rapidly increasing, it is becoming very expensive to ship bulk ingredients, such as crystalline fructose and flour, in completely prepackaged cake mixes to bakers all over the country.

SUMMARY OF THE INVENTION

As desirable as the sweetening and dietetic properties of fructose are, its use as a substitute for sugar in cake has not heretofore been at all successful. The reason is that fructose loses much of its sweetness when the cake batter is heated. When used as the sweetener in ordinary cake batter, the batter tastes sweet, but the baked cake tastes flat and unsweet.

The fact that fructose loses sweetness upon being heated may well explain why it has heretofore met with virtually no success in baked products. Indeed, its primary use has been in unheated foods, especially desserts, as exemplified by U.S. Pat. No. 3,236,658 entitled, "Fructose-Containing Frozen Dessert."

In an attempt to determine why fructose loses sweetness as it is heated, some researchers have shown that this relative sweetness of fructose is related to the degree of mutarotation from the sweeter β-D-fructopyranose form of the crystalline substance to the less sweet β-D-fructofuranose and α-D-fructofuranose forms. The term "mutarotation" refers to a change in chemical structure, under the influence of heat, to obtain a different isomer. Also, with increasing temperature and acidity, the ratio of pyranose of ferranose anomers, and, thus, the relative sweetness, decreases. In other words, as the temperature increases and the acidity increases, fructose decreases in sweetening power. These findings were reported by Theodore E. Doty in Cereal Foods World, February 1976, Vol. 21, No. 1.

While researchers may be able to explain how fructose loses its sweetness upon being heated, nobody has until now determined how fructose can be made to retain its sweetness, or otherwise be compensated for, in baked cakes. I have discovered a unique combination and proportion of ingredients and conditions which, when combined with fructose in a cake mix, produce a cake that is acceptably sweet and has good texture, flavor, volume, and mouth-feel as well. I have also devised a premix product which can be utilized with high fructose corn syrup (hereinafter referred to as HFCS). This permits a relatively non-bulky product to be shipped to commercial and institutional bakers who can easily combine the product with HFCS, flour and some other ingredients, such as flavoring to make a cake mix and produce an acceptable dietetic cake. As used herein 90% HFCS means 90% fructose syrup which is a colorless heavy syrup composed of approximately 80% solids and 20% water. Of the 80% solids, 90% is fructose and the remaining 10% being glucose, dextrose and other minor compounds. Corn syrup having higher and slightly lower percentages of fructose could be used.

In 42% HFCS, the composition is 71% dry solids and 29% water. The solids portion comprises 52% dextrose, 42% fructose and 6% higher saccharides, all by weight.

In 55% HFCS, the composition is 77% dry solids and 23% water. The solids portion comprises 42% dextrose, 55% fructose and 3% higher saccharides, all by weight.

In dextrose corn syrup, the composition is 71% dry solids and 29% water. The solids portion comprises 92% dextrose and the remainder is higher saccharides, all by weight.

The unique combination of ingredients includes flour, fructose, emulsifiers, and baking powder having glucono-delta-lactone as the acidic component.

It is not known exactly how, from a food chemistry standpoint, these ingredients, or one or more of them, enable the fructose to retain a sufficient degree of its sweetness while it is heated during the cake baking process. It is known that the resultant cake has an undeniably acceptably sweet taste. The residual sweetness in the baked cake may be a synergistic effect not directly attributable to the ordinary property of one of my unique combination of ingredients.

Further, my results relating to acidity and sweetness levels are completely contrary to what would be expected from a review of published research, as noted above. I have unexpectedly discovered that in my cake mix, the resultant cake has an acidic pH which generally falls in the range of about 3.5 to about 6.5. In fact, my research indicates that in my cake mix, the pH must be acidic or the level of sweetness in the baked cake becomes unacceptable.

Additionally, since the premix product and cake mix are free of egg yolks and whole milk, it is very low in cholesterol so that the cake is especially suited for coronary care patients and others requiring a low cholesterol diet.

OJBECTS OF THIS INVENTION

Accordingly, it is an object of this invention to provide a dietetic cake mix that utilizes fructose as the sweetening agent and produces a finished cake which is acceptably sweet.

Another object of this invention is to provide a dietetic cake mix that utilizes fructose as the sweetening agent and produces a baked cake which is both acceptably sweet and acidic in pH, but not sour in taste.

Another object of this invention is to provide a dietetic cake mix that utilizes fructose as the sweetening agent and produces a cake with good volume, moisture retention, texture, appearance, mouth-feel and acceptably sweet taste.

Another object of the invention is to provide a dietetic cake mix that utilizes fructose as the sweetening agent and produces a cake wherein the pH is between about 3.5 and less than 6.5.

Still another object of the invention is to provide a dietetic cake mix that is free of artificial sweeteners, egg yolks and ordinary sugar.

Another object of the invention is to provide a dietetic cake mix suitable for use by people who are diabetics or on a low cholesterol diet.

A further object of the invention is to provide a dietetic cake mix that utilizes fructose as the sweetener and wherein the ratio of the fructose to flour by weight is moderate, that is about 0.90 or less.

Another object is to provide a dietetic cake mix that utilizes fructose as the sweetener wherein the ratio of the fructose to the acidic component of the baking powder by weight is between about 10 and about 30.

Another object of this invention is to provide a premix product for a dietetic cake mix which utilizes high fructose corn syrup as the sweetener.

Yet another object of this invention is to provide a premix product for a dietetic cake mix which utilizes high fructose corn syrup as the sweetener and produces a cake having the properties and characteristics of the prior objects. It is especially intended to be used by commercial and institutional bakers.

Still another object of his invention is to provide a premix product for a dietetic cake mix which utilizes high fructose corn syrup as the sweetener wherein the weight of the emulsifier portion of the premix product to the cake mix, less the HFCS and flour, is about 30%, or less.

Another object of this invention is to provide a dietetic cake mix which utilizes dextrose syrup as the sweetener.

Lastly, an object of this invention is to provide a dietetic cake mix which utilizes 42% or 55% HFCS, is free of starch and produces a cake having good volume, texture, flavor, moisture, mouth-feel and sweetness as well as acceptable shelf life.

A feature of the cake mix is the use of glucono-delta-lactone as the acidic component in the baking powder portion.

Another feature of the cake mix is the use of a single action baking powder.

An advantage of this invention is that less actual fructose is required when utilizing HFCS in the cake mix than when utilizing crystalline fructose.

Other objects, features and advantages of the invention will become readily apparent, especially to those skilled in the art, when the following description of the preferred embodiments is read.

DESCRIPTION OF THE PREFERRED EMBODIMENTS

This cake mix in its dry form comprises three basic components: a non-shortening portion, a baking powder portion and a shortening portion. The non-shortening portion essentially consists of the stable, non-reactive ingredients, such as flour, skim milk solids, egg whites and salt.

The baking powder portion consists of a "balanced" amount of alkaline bicarbonate component (bicarbonate of soda) and an acid which reacts with the bicarbonate in the presence of water to liberate carbon dioxide gas. This gas is dispersed throughout the batter to give the baked cake its characteristic light texture and mouth-feel. The particular acidic component of the baking powder used in this cake, and the relative proportion, is important as will be explained in more detail when the examples are described.

The shortening portion comprises a blend of primary emulsifiers, an emulsifier enhancer and vegetable fat or oil. The preferred fat component used in this cake mix is a liquid vegetable oil and is selected for its stability since it is desired to prevent oxidation and subsequent rancidification of the shortening while the mix is on the retailer's shelf. Hydrogenated vegetable oils are high in saturated fats. The higher the saturated (i.e. hydrogenated) fat level, the more stable the product. Conversely, the lower the saturated fat level, the less stable the product. Our preferred liquid vegetable oil is primarily monounsaturated, but contains some saturated, and a small portion of polyunsaturated, fatty acids.

The dry mix is formed when the non-shortening, baking powder and shortening portions are combined and blended to produce a powder suitable for packaging. Adding water to the dry mix powder and blending produces a batter ready for baking.

When water is added to the dry mix, the emulsifiers act to combine the oil (fat) in the shortening with the water so that they can be mixed with the other ingredients to form a homogeneous mixture and to incorporate air into the batter.

In some cake mixes, a so-called "double action" baking powder is used. Such a "double action" baking powder has some components that react with water at room temperature to produce carbon dioxide gas while the batter is being mixed to make the batter "light" before it is baked. Such "lightness" in the batter is important to assure uniformity of the well known sponge-like texture in the baked cake. Other components react when the batter is heated to form the carbon dioxide gas to make the cake rise to its final dimensions as it is baked.

My cake used a "single action type" baking powder that reacts in the presence of water only when heat is applied in the oven. However, due to the unusual blend of emulsifiers, emulsifier enhancers, and their very effective reaction and combination with other ingredients, I am able to achieve sufficient rising in the batter as the cake is being baked to avoid the necessity of using a double action baking powder. Still, I achieve excellent uniformity and good texture in the baked cake.

By eliminating the necessity of using a double acting baking powder, the stability of the mix on the shelf is increased since the single action baking powder is not as susceptible to reaction with moisture in the air and subsequent deterioration.

It is important that the acidic and basic components of the baking powder be balanced. This does not necessarily mean that equal amounts or weights of these components be used, but rather that they are so proportioned that after their chemical reaction with the other ingredients, the cake is neither sour, as when the acidic component dominates excessively, or flat, tasteless, or off-taste as when the basic component dominates. Such an acidic/basic balance to achieve good taste is not easy to obtain and is utterly unpredictable, even by food experts, based on the ordinary taste and flavor of the ingredients alone and their relative proportions. The relationships between taste, flavor, sweetness, texture and mouth-feel are so delicate, complex, interdependent and variable that merely adding or deleting an ingredient with a known property (such as a flavor enhancer) or taste (such as fructose) or changing the relative proportion of it in the mix does not automatically produce the expected result. For example, if the acidic and basic components are balanced to produce a neutral pH cake, the flavor may not be strong or an off-taste may be present.

In this regard, I have found that in order to retard, suppress or otherwise compensate for the chemical change of the fructose into less sweet components in my cake mix batter as the cake is baked, the baking powder portion must be somewhat acidic so that the baked cake itself is slightly acidic and sweet tasting. However, too much acidity may produce a bitter or sour tasting cake. In other words, when fructose is used as the sweetener, the overall sweetness of the batter is retained in the cake when the acidic component of the baking powder dominates, but to a limited extent. As pointed out in the Summary of the Invention, this contradicts published authority on the behavior of fructose when it is heated and is, I believe, one of the reasons for the success of my cake mix. If fructose is merely substituted for sugar in an ordinary cake mix, the baked cake is absolutely flat tasting instead of being comparatively sweet.

The acidic component of the baking powder that I have found to produce the best results is glucono-delta-lactone (a gluconate herein referred to as GDL). However, other acid components (gluconates and others) can be used with varying degrees of acceptable results. Some of these acids are calcium acid mono-phosphate, sodium aluminum phosphate (acidic), tartaric, fumaric, or any edible acid such as citric, lactic or malic acid that is in a fine, preferably powdered or crystalline, form and is coated or micro-encapsulated with a material, such as a hard fat or emulsifier, that will prevent premature reaction with the basic (alkaline) component of the baking powder during storage or while the batter is being mixed. The basic component of the baking powder is either sodium or, preferably, potassium bicarbonate. Depending on the specific cake formulation, the bicarbonate may be encapsulated in lieu of the GDL, or both may be encapsulated.

The primary emulsifier that provides the best results is actually a blend of two emulsifiers, propylene glycol monostearate (PGMS) and a lactated monoglyceride (LMG), such as Durlac 100 which is manufactured by Durkee Foods.

Other primary emulsifiers can be used with acceptable results. Examples are glyceryl lacto-stearate (GLS) and glyceryl monostearate (GM).

An emulsion enhancer is included in the shortening portion. This is stearyl monoglyceridyl citrate (SMGC) which also functions as a stabilizer and is described in my U.S. Pat. No. 3,227,559. In this cake mix, the SMGC functions to stabilize the batter before and during baking and also enhances flavor and texture. The shortening is preferably a liquid vegetable oil, such as Durkex 500 made by Durkee Foods, that has a high oxidative stability.

The following examples are presented to teach the various means of practicing my invention including the best mode contemplated at present. Naturally, these examples should not be interpreted as representing the only way the invention can be practiced.

In each of the following examples, the Non-Shortening and Shortening Portions are the same, with only the Baking Powder Portions varying. Also in each example, the mixing instructions are the same as follows:

MIXING INSTRUCTIONS

Add five ounces of water to the mix in a small bowl and mix slowly to wet ingredients. Mix for four minutes at a speed corresponding to number six or seven on a Sunbeam Mixmaster. Pour 12.5 ounces of batter into a small (i.e. 8½"×4½"×2⅝") loaf pan or an 8 inch round pan and bake for 30 minutes at 350° F. Remove cake and allow to cool.

To test the acidity of the batter and of the cake at various times during the baking process, a batch of batter of examples 1 and 2 was placed in each of six paper cupcakes. They were all placed in the oven and removed one at a time in five minute intervals. After cooling, some of each sample was placed into a ceramic cup with distilled water and mixed for 15-20 seconds. The aqueous mixture was then tested with universal pH paper which was then compared to a standard to measure the pH.

| Dietary White Cake Mix | | |
|---|---|---|
| Ingredient | Ounces | Grams |
| Non-Shortening Portion | | |
| Flour | 3.775 | 106.98 |
| Fructose | 3.0 | 85.02 |
| Skim Milk Solids | 0.45 | 12.75 |
| Dried Egg Whites | 0.25 | 7.09 |
| Torula Yeast (Torutein 94) | 0.25 | 7.09 |
| Starch (721A) | 0.10 | 2.83 |
| Vanillin (16 fold) | 0.02 | 0.57 |
| Salt | 0.09 | 2.55 |

| -continued | | |
|---|---|---|
| Dietary White Cake Mix | | |
| Ingredient | Ounces | Grams |
| | 7.935 | 224.88 |
| Shortening portion | | |
| Liquid Shortening (Durkex 500) | 1.23 | 35.0 |
| Propylene Glycol Monostearate | 0.07 | 2.0 |
| Lactated Monoglycerides (Durlac 100) | 0.07 | 2.0 |
| Stearyl Monoglyceridyl Citrate | 0.035 | 1.0 |
| | 1.405 | 40.0 |

Example 1

| Baking Powder Portion | | |
|---|---|---|
| Ingredient | Ounces | Grams |
| Potassium Bicarbonate | 0.10 | 2.83 |
| Glucono-Delta-Lactone | 0.22 | 6.23 |

| Comments on Cake | | | |
|---|---|---|---|
| Color: | Uniform medium brown top | pH Data | |
| Sweetness: | Acceptable | Baking Time | pH |
| Overall quality: | Good texture and volume | batter | 6.0 |
| | | 5 min. | 6.0 |
| | Good Cake | 10 min. | 6.0 |
| | | 15 min. | 5.0 |
| | | 20 min. | 5.0 |
| | | 25 min. | 4.5 |

Example 2

| Baking Powder Portion | | |
|---|---|---|
| Ingredient | Ounces | Grams |
| Potassium Bicarbonate | 0.1 | 2.83 |
| Sodium Aluminum Phosphate (acidic) | 0.1 | 2.83 |

| Comments on Cake | | | |
|---|---|---|---|
| Color: | Uniform medium brown top | pH Data | |
| Sweetness: | Very low | Baking Time | pH |
| Overall quality: | Good texture and volume, but not an acceptable cake due to insufficient sweetness | batter | 6.5 |
| | | 5 min. | 6.5 |
| | | 10 min. | 6.0 |
| | | 15 min. | 6.0 |
| | | 20 min. | 6.0 |
| | | 25 min. | 6.0 |

Example 3

| Baking Powder Portion | | |
|---|---|---|
| Ingredient | Ounces | Grams |
| Potassium Bicarbonate | 0.1 | 2.83 |
| Sodium Aluminum Phosphate | 0.1 | 2.83 |
| Glucono-Delta-Lactone | 0.05 | 1.417 |

| Comments on Cake | | |
|---|---|---|
| Color: | Uniform medium brown top | pH Data |
| Sweetness: | Slightly sweet, barely acceptable | cake pH = 5.0 |
| Overall quality: | Good texture and volume; good cake. | |

Example 4

| Baking Powder Portion | | |
|---|---|---|
| Ingredient | Ounces | Grams |
| Potassium Bicarbonate | 0.10 | 2.83 |
| Sodium Aluminum Phosphate (acidic) | 0.2 | 5.67 |

| Comments on Cake | | |
|---|---|---|
| Color: | Uniform medium brown top | pH Data |
| Sweetness: | Slightly sweet | Cake pH = 5.0 |
| Overall quality: | Good volume and texture, but as the mouth-feel taste was mealy the cake was | |

Example 4-continued unacceptable.

Example 5

Baking Powder Portion

| Ingredient | Ounces | Grams |
|---|---|---|
| Potassium Bicarbonate | 0.1 | 2.83 |
| Glucono-Delta-Lactone | 0.18 | 5.10 |

Comments on Cake

| | | |
|---|---|---|
| Color: | Uniform medium brown top | pH Data |
| Sweetness: | Slightly sweet | cake pH = 5.0 |
| Overall quality: | High volume, good texture; acceptable cake. | |

Example 6

Baking Powder Portion

| Ingredient | Ounces | Grams |
|---|---|---|
| Potassium Bicarbonate | 0.1 | 2.83 |
| Glucono-Delta-Lactone | 0.11 | 3.12 |

Comments on Cake

| | | |
|---|---|---|
| Color: | Uniform medium brown top | pH Data |
| Sweetness: | Very low sweetness, barely acceptable | cake pH = 6.0 |
| Overall quality: | Good volume and texture. | |

Example 7

Baking Powder Portion

| Ingredient | Ounces | Grams |
|---|---|---|
| Potassium Bicarbonate | 0.1 | 2.83 |
| Anhydrous citric acid - coated with 30% Stearine (Durkee's #150 - 70 (SR) | 0.13 | 3.68 |

Comments on Cake

| | | |
|---|---|---|
| Color: | Medium brown top with small dark spots | pH Data Cake pH = 4.0 |
| Sweetness: | Slightly bitter | |
| Overall quality: | Good texture and volume, but cake was too bitter to be acceptable. | |

Example 8

Baking Powder Portion

| Ingredient | Ounces | Grams |
|---|---|---|
| Potassium Bicarbonate | 0.1 | 2.83 |
| 70% citric acid (encapsulated) | 0.09 | 2.55 |

Comments on Cake

| | | |
|---|---|---|
| Color: | Medium brown top with small dark spots | pH Data cake pH = 5.0 |
| Sweetness: | Slightly sweet | |
| Overall quality: | dark spots caused by small crystals of citric acid. Small areas of gunky masses just under surface of cake. Cake not acceptable. | |

From these examples, it is seen that the degree of acidity, measured in pH, of acceptable cakes, as determined by their sweetness, varies from about 4.5 to about 5.0. In my opinion, acceptably sweet cakes can be made having pH values somewhat below 4.5 and somewhat above 5.0. The pH range would then extend from about 3.5 to less than about 6.5 for cakes having acceptable sweetness. Cakes having a pH less than about 3.5 might tend to be too sour or bitter, and cakes having a pH above about 6.5 might tend to be bland and not sweet enough.

As can be readily seen from examples 1 (best mode) and 2, the acidity increases as the baking cycle continues. Further, the more acidic the cake, up to a point, the sweeter it is starting with the same amount of fructose.

Tests 2, 3 and 4 illustrate that with the shortening and non-shortening portions as described, acidic sodium aluminum phosphate in the white cake cannot be substituted satisfactorily for GDL and produce an acceptably sweet cake. However, when GDL is used with sodium aluminum phosphate, the cake is acceptably sweet. The cake produced with sodium aluminum phosphate (acidic) alone is either insufficiently sweet, or mealy. It is possible, however, that in modifying the shortening and non-shortening portions, an acceptably sweet cake could be made.

Comparing tests 2, 3, 4 with the cake baked with varying amounts of GDL in tests 1, 5 and 6 shows that GDL produces a cake of superior sweetness and the sweetness increases as the cake becomes more acidic up to a point (a pH of about 3.5).

Tests 7 and 8 illustrate what happens if the acidic component of the baking powder is too coarse, even when it is coated, or microencapsulated, to prevent premature reaction with the alkaline component of the baking powder. If the citric acid in test 7 had been in a fine grade, such as a powder or very fine grains, the cake would have been acceptable.

In the non-shortening portion, some of the ingredients are common to many cake mixes. These are flour, starch, skim milk solids, dried egg whites and salt. The torula yeast functions as a replacement for some egg whites, which are quite expensive, and as a flavor enhancer. A passable cake can be made omitting the torula yeast, but it is not as light. Egg yolks are not needed due to the effectiveness of the emulsifiers. Vanillin is an artificial flavoring.

Some other observations can be made from the results of the examples. One is that a great deal of fructose is not needed to obtain the desired sweetness. It is reasonable to conclude, for example, that if 6, 8 or 10 ounces of fructose, instead of 3 ounces, were mixed with 3.775 ounces of flour, a sweet cake would be produced regardless of its pH value. However, this would be a much more expensive cake having much more calories and sugar. Such a cake would be contrary to the objects, features and advantages of my cake.

Therefore, the ratio of fructose to flour by weight in my cake is moderate. In my preferred embodiment, I use a ratio of about 0.8 (i.e. 3.0 oz. divided by 3.775 oz.), although a slightly higher ratio (i.e. about 0.9) would still produce an acceptable cake. A related ratio is the ratio of fructose (85.02 gm to the weight of the non-shortening portion of the mix 224.88 gm). This ratio (0.38), plus or minus about 10% is also indicative of the moderate amount of fructose utilized by my cake mix which produces an acceptably sweet cake.

Another ratio of significance is the weight of the fructose to the acidic component of the baking powder portion. This ratio varies from about 10 (13.65 in example 1) to about 30 (27.25 in example 6).

Other observations relate to the ratios of the acidic and basic components and of the non-shortening, shortening and baking powder portions. As with the pH values, I am concerned with those ratios in cakes that have proved to be acceptably sweet.

In examples 1, 3, 5 and 6, the ratio of the acidic component to the basic (bicarbonate) component ranged from 1.1:1.0 to 2.2:1.0.

Regarding the ratios of the non-shortening/shortening and baking powder portions in examples 1, 3, 5, 6, 7 and 8, the range was from 82.1:14.59:3.31 in example 1 to 83.22:14.79:1.99 in example 8. These ratios are illustrative of the relative proportions of the three major components of the cake mix.

The examples pertain to a white cake mix. If, for example, a lemon flavored cake mix is desired, lemon oil or flavor is added to the dry mix in an amount necessary to provide the desired degree of lemon flavor.

The white cake mix utilizing the 90% high fructose corn syrup (HFCS) is essentially a "wet" version of the dry cake mix just described. The desired pH range of from about 3.5 to less than about 6.0 is, of course, the same. A special adaptation of emulsifier and baking powder ingredients into a premix package constitutes a separate product which can be carefully controlled in terms of quality and proportion of ingredients. This enables this premix product to be shipped to commercial and institutional bakers all over the country to be combined with other ingredients to form the cake mix.

Crystalline fructose is only available from a very few suppliers, mostly foreign. It is expensive (currently, about $0.82 per pound compared to about $0.15–$0.24 for ordinary sugar), difficult to obtain in quantity and difficult to work with. For example, it is very hygroscopic. Therefore, if the entire dry cake mix utilizing crystalline fructose is offered to commercial and institutional bakers, it is quite expensive and continuous supply is difficult to maintain.

By contrast, fructose in the form of high fructose corn syrup is relatively plentiful, domestically produced and comparatively cheap (currently, about $0.24 per pound after dehydration). Further, HFCS is relatively easy to handle.

By offering the permix product to various independent commercial and institutional bakeries at widely separated locations, the quality and uniformity of the cake baked from the final cake mix utilizing HFCS can be controlled more easily and effectively standardized. The availability and price of the cake baked with the premix product will also be more competitive in the marketplace. The premix product is therefore especially intended to be used by commercial and institutional bakeries in combination with 90% HFCS to bake dietetic cakes.

In the premix product for use with 90% HFCS, the emulsifier portion preferably comprises the following ingredients in the indicated proportions which, when mixed, heated and sprayed down a cooling tower, forms a dry, powdered composition.

| Ingredient | Proportion Percent by Weight |
|---|---|
| Propylene Glycol Monostearate | 10% |
| Lactated Monoglycerides (Durlac 100) | 10% |
| Stearyl Monoglyceridyl Citrate | 5% |
| Skim Milk Solids (Non-fat Dry Milk) | 31% |
| Liquid Shortening (Durkex 500) | 44% |
| | 100% |

The baking powder portion comprises potassium (preferred) or sodium bicarbonate as the basic component and glucono-delta-lactone (preferred) or acidic sodium aluminum phosphate as the acidic component.

The combination of the emulsifier and baking powder portions constitute the premix product. However, the premix product may contain only a portion of the ingredients in the emulsifier portion. For example, the SMGC could be eliminated. Further, the skim milk solids and liquid shortening could be supplied in the Main Portion of the mix. Set forth below is the basic white cake mix recipe utilizing the premix product.

MIXING INSTRUCTIONS

Since the fructose is in a liquid form, the mixing is slightly different than for the dry cake mix. All the dry ingredients are placed into a small bowl and mixed with an electric beater. Then the shortening is added. This consists of a plastic shortening, such as Durkee's Code 321. The shortening is mixed with the dry ingredients until dispersed thoroughly. The fructose syrup is poured slowly into the contents of the bowl as the beaters are slowly mixing it at, for example, a speed corresponding to No. 1 on a Sunbeam mixer. Finally, two-thirds of a cup of water is used to rinse out the container from which the 90% HFCS was poured and this is added to the contents of the bowl. The mixture is then stirred until the batter is smooth and then mixed with the electric mixer at medium to high speed for four minutes.

At this point, for the following examples, the specific gravity of the batter was taken. Then 12.5 ounces of batter was weighed into a loaf pan measuring 8⅛"×4½"×2⅝" and baked at 350° F. for 29 minutes.

When done, the cakes in the examples were cooled on a rack and evaluated. The cakes were cut in half and the volume was noted visually as well as the texture and structure. The cakes were tasted for sweetness and mouth-feel. Some of each cake was placed in a ceramic cup with distilled water and mixed for 15–20 seconds and then tested with universal pH paper which was then compared to a standard to measure the pH.

| Dietary White Cake | | |
|---|---|---|
| Ingredient | Ounces | Grams |
| Main Portion | | |
| Flour | 3.775 | 106.984 |
| Fructose Syrup (ADM 90% "Cornsweet") | 3.330 | 94.372 |
| Skim Milk Solids | 0.247 | 7.000 |
| Dried Egg Whites | 0.250 | 7.085 |
| Torula Yeast (Torutein 94) | 0.250 | 7.085 |
| Starch (721A) | 0.100 | 2.834 |
| Salt | 0.092 | 2.600 |
| Vanillin (16 fold) | 0.021 | 0.600 |
| Vanilla on Whey | 0.035 | 1.000 |
| | 8.100 | 229.560 |
| Shortening Portion | | |
| Shortening (Durkee's plastic, Code 321) | 0.741 | 21.0 |

| Product Premix - Emulsifier Portion | | |
|---|---|---|
| Ingredient | Ounces | Grams |
| Propylene Glycol Monostearate | 0.0706 | 2.0 |
| Lactated Monoglycerides (Durlac 100) | 0.0706 | 2.0 |
| Liquid Shortening (Durkex 500) | 3.3105 | 8.8 |
| Stearyl Monoglyceridyl Citrate | 0.0353 | 1.0 |
| Skim Milk Solids (Non-fat Dry Milk) | 0.2188 | 6.2 |
| | 0.7058 | 20.0 |

Example 9

Product
Premix - Baking Powder Portion

| Ingredient | Ounces | Grams |
|---|---|---|
| Potassium Bicarbonate | 0.100 | 2.834 |
| Glucono-Delta-Lactone | 0.220 | 6.235 |

Comments on Cake

| | |
|---|---|
| Color: | Brown and crisp top. |
| Sweetness: | Sweet |
| pH: 5.0 | Sp. G. of Batter: 0.85 |
| Overall Quality: | Good texture, high volume, excellent mouth-feel; crack on top. Excellent cake. |

Example 10

| Ingredient | Ounces | Grams |
|---|---|---|
| Potassium Bicarbonate | 0.100 | 2.834 |
| Sodium Aluminum Phosphate (acidic) | 0.100 | 2.834 |

Comments on Cake

| | |
|---|---|
| Color: | Brown and crisp top. |
| Sweetness: | Slightly sweet. |
| pH: 6.0 | sp. G. of Batter: 0.86 |
| Overall Quality: | Fine texture, medium volume, fair to good mouth-feel; compact structure, low sides, high middle, lengthwise crack on top. Fair cake. |

Example 11

| Ingredient | Ounces | Grams |
|---|---|---|
| Potassium Bicarbonate | 0.100 | 2.834 |
| Sodium Aluminum Phosphate (acidic) | 0.100 | 2.834 |
| Glucono-Delta-Lactone | 0.100 | 2.834 |

Comments on Cake

| | |
|---|---|
| Color: | Brown and crisp top. |
| Sweetness: | Sweet as Example 9. |
| pH: 5.0 | Sp. G. of Batter: 0.83 |
| Overall Quality: | Fine texture, low volume, poor mouth-feel; moist, compact, low sides and low middle, badly cracked top. Poor cake. |

Example 12

| Ingredient | Ounces | Grams |
|---|---|---|
| Potassium Bicarbonate | 0.100 | 2.834 |
| Sodium Aluminum Phosphate (acidic) | 0.200 | 2.834 |

Comments on Cake

| | |
|---|---|
| Color: | Brown and crisp top. |
| Sweetness: | Marginal sweetness, barely perceptible. |
| pH: 5.5 | sp. G. of Batter: 0.82 |
| Overall Quality: | Even and compact texture, medium volume, fair mouth-feel; low sides, high center, crack down the middle. Fair cake. |

Example 13

| Ingredient | Ounces | Grams |
|---|---|---|
| Potassium Bicarbonate | 0.100 | 2.834 |
| Glucono-Delta-Lactone | 0.150 | 4.251 |

Comments on Cake

| | |
|---|---|
| Color: | Brown and crisp top. |
| Sweetness: | Not sweet enough. |
| pH: 5.5 | Sp. G. of Batter: 0.77 |
| Overall Quality: | Very good texture, high volume, good mouth-feel; high sides and center. Cake not sweet enough to be commercially acceptable. |

Several additional comments can be made about the cakes baked in examples 9-13 from cake mixes made with the premix product and 90% HFCS. In the first place, less actual fructose is used. For example, 3.33 ounces of 90% HFCS means that the fructose content is 3.33 ounces 90% HFCS×0.8 solids/HFCS×0.9 fructose/solids=2.3976 ounces compared with 3.0 ounces in the dry cake mix.

Perhaps the most surprising aspect of the cakes baked with the 90% HFCS is that the best cake (i.e. example 9) was sweater than the corresponding cake (i.e. example 1) baked utilizing crystalline fructose. This was serendipity.

The biggest and best cake was produced when using GDL rather than sodium aluminum phosphate. Further, when using crystalline fructose, there is little or no effect of the various baking powder combinations on the volume and texture of the cakes. With 90% HFCS, there is a marked effect on the volume and texture of the finished cakes.

The following examples show the results of using 42% and 55% HFCS and 92% dextrose corn syrup in a dietary white cake mix. The emulsifier portion comprises the same components in the same proportions as in the premix product utilizing 90% HFCS, and is preferably in the same dry, powdered composition as follows:

| Ingredient | Proportion Percent by Weight |
|---|---|
| Propylene Glycol Monostearate | 10% |
| Lactated Monoglycerides (Durlac 100) | 10% |
| Stearyl Monoglyceridyl Citrate | 5% |
| Skim Milk Solids (Non-fat Dry Milk) | 31% |
| Liquid Shortening (Durkex 500) | 44% |
| | 100% |

The baking powder portion comprises potassium (preferred) or sodium bicarbonate as the basic component and glucono-delta-lactone (preferred) or acidic sodium aluminum phosphate as the acidic component.

These examples are presented to teach the various ways of practicing the invention utilizing 42% and 55% HFCS including the best mode contemplated at present. Naturally, these examples should not be interpreted as representing the only way the invention can be practiced.

MIXING INSTRUCTIONS

White Cake Mix Utilizing 42% and 55% HFCS

The dry ingredients are mixed together including the baking powder. Next, the shortening is added and the entire mixture is mixed in a small bowl at low speed, such as with a Sunbeam Mixmaster. Both 42% and 55% HFCS contain solids and liquid at room temperature, so they must be shaken thoroughly before using to assure uniform portions of their components. The liquid HFCS is added during the low speed mixing. The container for the HFCS is rinsed with 100 ml. of water (for the mixes utilizing 42% HFCS) or 120 ml. of water (for the mixes utilizing 55% HFCS). The batter is then mixed at higher speeds, such as number 6 or 7 on a Sunbeam Mixmaster, for four minutes. A small pan (i.e. 4½"×8½"×2⅜") is prepared, such as by spraying it with a preparation to prevent sticking, and 12.5 ounces of batter are poured in. The batter is baked for 29 minutes at 350° F. Remove cake and allow to cool on a rack.

During the preparation of the cake mix, the completed batter was tested for specific gravity. To test pH, a portion of the baked cake was placed in a ceramic cup with distilled water and this mixture was tested with universal pH paper and compared to a standard to measure the pH.

After the baked cake had cooled, it was cut open to observe the texture, estimate its volume and tasted for sweetness level.

Dietary White Cake

| Ingredient | Ounces | Grams |
|---|---|---|
| Main Portion | | |
| Flour | 3.800 | 107.692 |
| Skim Milk Solids | 0.245 | 7.000 |
| Dried Egg Whites | 0.250 | 7.085 |
| Torula Yeast (Torutein 94) | 0.250 | 7.085 |
| Vanillin (16 fold) | .021 | 0.600 |
| Vanilla on whey | .035 | 1.000 |
| Salt | .092 | 2.600 |
| | 4.693 | 133.062 |
| Emulsifier Portion | | |
| Propylene Glycol Monostearate | 0.0706 | 2.0 |
| Lactated Monoglycerides (Durlac 100) | 0.0706 | 2.0 |
| Liquid Shortening (Durkex 500) | 0.3105 | 8.8 |
| Stearyl Monoglyceridyl Citrate | 0.0353 | 1.0 |
| Skim Milk Solids (non-fat dry milk) | 0.2188 | 6.2 |
| | 0.7058 | 20.0 |
| Shortening Portion | | |
| Shortening (Durkee's plastic, Code 321) | 0.741 | 21.0 |
| Examples Utilizing 42% HFCS | | |
| 42% HFCS (Cornsweet 42) | 5.0 | 141.70 |

Example 14

| Baking Powder Portion | | |
|---|---|---|
| Ingredients | Ounces | Grams |
| Potassium Bicarbonate | 0.1 | 2.83 |
| Glucono-Delta-Lactone | 0.22 | 6.23 |
| | 0.32 | 9.06 |

| Comments on Cake | | |
|---|---|---|
| Color: | Thick and white batter. | pH: 5.0 |
| Sweetness: | Passable | |
| Overall Quality: | High volume, good texture. | Sp. G. of Batter: 0.86 |

Example 15

| Baking Powder Portion | | |
|---|---|---|
| Ingredients | Ounces | Grams |
| Potassium Bicarbonate | 0.1 | 2.83 |
| Sodium Aluminum Phosphate (acidic) | 0.1 | 2.83 |
| | 0.2 | 5.66 |

| Comments on Cake | | |
|---|---|---|
| Color: | Thick and white batter; nice brown top on baked cake. | pH: 6.0 |
| Sweetness: | Slightly sweeter than Example 14. | Sp. G. of Batter: 0.90 |
| Overall Quality: | High volume, but not as high as Example 14; good texture; slight metallic off-taste. | |

Example 16

| Baking Powder Portion | | |
|---|---|---|
| Ingredients | Ounces | Grams |
| Potassium Bicarbonate | 0.1 | 2.83 |
| Glucono-Delta-Lactone | 0.1 | 2.83 |
| Sodium Aluminum Phosphate | 0.1 | 2.83 |
| | 0.3 | 8.49 |

Example 16-continued

| Comments on Cake | | |
|---|---|---|
| Color: | Thick and white batter; nice brown top on baked cake | pH: 5.25 |
| Sweetness: | As sweet as cake in Example 15. | Sp. G: 0.90 |
| Overall Quality: | Good volume and texture; slight off-taste. | |

Example 17

| Baking Powder Portion | | |
|---|---|---|
| Ingredients | Ounces | Grams |
| Potassium Bicarbonate | 0.1 | 2.83 |
| Glucono-Delta-Lactone | 0.17 | 4.82 |
| | 0.27 | 7.65 |

| Comments on Cake | | |
|---|---|---|
| Color: | Thick & white batter; nice brown top on baked cake. | pH: 5.0 |
| Sweetness: | Acceptable | Sp G. 0.87 |
| Overall Quality: | High volume and good texture; brown top on baked cake. Best cake. | |

Example 18

| Baking Powder Portion | | |
|---|---|---|
| Ingredients | Ounces | Grams |
| Calumet Double Acting Baking Powder | 0.25 | 7.09 |

| Comments on Cake | | |
|---|---|---|
| Color: | Thick and white batter; nice brown top on baked cake. | pH: 5.5 |
| Sweetness: | Barely perceptible | Sp. G.: 0.95 |
| Overall Quality: | Low volume, compact cake; pale top. Not a good cake. | |

| Examples Utilizing 55% HFCS | | |
|---|---|---|
| Ingredient | Ounces | Grams |
| 55% HFCS (Cornsweet) | 3.8 | 107.69 |

Example 19

| Baking Powder Portion | | |
|---|---|---|
| Ingredients | Ounces | Grams |
| Potassium Bicarbonate | 0.1 | 2.83 |
| Glucono-Delta-Lactone | 0.22 | 6.23 |
| | 0.32 | 9.06 |

| Comments on Cake | | |
|---|---|---|
| Color: | Thick and white batter; nice brown top on baked cake. | pH: 5.0 |
| Sweetness: | Acceptable good texture. | Sp. G. 0.81 |

Example 20

| Baking Powder Portion | | |
|---|---|---|
| Ingredients | Ounces | Grams |
| Potassium Bicarbonate | 0.1 | 2.83 |
| Sodium Aluminum Phosphate | 0.1 | 2.83 |
| | 0.2 | 5.66 |

| Comments on Cake | | |
|---|---|---|
| Color: | Thick and white batter; nice brown top on baked cake. | pH: 6.0 |
| Sweetness: | Passable. | Sp. G. 0.89 |

Example 20-continued

| | |
|---|---|
| Overall Quality: | Good volume and texture. |

Example 21

| Baking Powder Portion | | |
|---|---|---|
| Ingredient | Ounces | Grams |
| Potassium Bicarbonate | 0.1 | 2.83 |
| Glucono-Delta-Lactone | 0.1 | 2.83 |
| Sodium Aluminum Phosphate | 0.1 | 2.83 |
| | 0.3 | 8.49 |

| Comments on Cake | | |
|---|---|---|
| Color: | Thick and white batter; nice brown top on baked cake. | pH: 5.5 |
| Sweetness: | Passable, but on the low side. | Sp. G.: 0.96 |
| Overall Quality: | Good volume, nice texture. | |

Example 22

| Baking Powder Portion | | |
|---|---|---|
| Ingredient | Ounces | Grams |
| Potassium Bicarbonate | 0.1 | 2.83 |
| Glucono-Delta-Lactone | 0.17 | 4.82 |
| | 0.27 | 7.65 |

| Comments on Cake | | |
|---|---|---|
| Color: | Thick and white batter; nice brown top on baked cake. | pH: 5.0 |
| Sweetness: | Sweeter than the cake in Example 20. Good volume and texture. Very good cake. | Sp. G.: 0.85 |

With regard to examples 14 through 18 utilizing 42% HFCS, it is seen that the best cakes, as determined by their sweetness, have pH values not greater than about 5.0.

With regard to examples 19 through 22 utilizing 55% HFCS, the best cake (example 22) also had a pH of about 5.0. In my opinion, acceptable cakes can be baked with a pH of from about 3.5 to about 6.5.

Cakes in examples 15 and 20, which have no glucono-delta-lactone, could be considered borderline acceptable and have pH values of 6.0. The cakes which have the best overall characteristics (examples 17, 19, 22 and, to a slightly lesser extent, examples 14 and 21) all include glucono-delta-lactone.

Perhaps the most unusual aspect regarding the cakes baked with 42% and 55% HFCS is that they contain no starch. In other cake mixes, starch is added to thicken the batter and entrain air in order to improve the volume and texture. In this invention, the 42% and 55% HFCS is thick enough itself to entrain sufficient air in the batter to produce a cake with high volume, good texture and sweetness.

The ratio of fructose (dry basis) to the acidic component of the acceptable cakes ranged from about 5 (6.77 in example 14) to about 10 (9.47 in example 22). The ratio of the emulsifier (i.e. propylene glycol monostearate and lactated monoglycerides) to the acidic component of the baking powder ranged from about 0.4 (examples 14, 19) and 0.7 (examples 15,20), so acceptable cakes can be produced when this ratio exceeds about 0.4.

Another characteristic of the 42% and 55% HFCS cakes is that they have a low fructose/flour ratio compared to the cakes baked with crystalline fructose or 90% HFCS. For example, with 42% HFCS, the amount of fructose in the cake is 0.42 fructose/solids×0.71 solids/HFCS×5 ounces HFCS=1.49 ounces fructose and the fructose/flour ratio is 1.49/3.8=0.39. With the 55% HFCS, the amount of fructose in the cake is 0.55 fructose/solids×0.77 solids/HFCS×3.8 ounces HFCS=1.61 ounces fructose and the fructose/flour ratio is 1.61/3.8=0.42. A ratio of less than fructose/flour about 0.5:1.0 is acceptable and desirable. Corresponding figures for 90% HFCS and crystalline fructose are 2.40 ounces fructose (0.64 fructose/flour) and 3.0 ounces fructose (0.79 fructose/flour), respectively using their cake mix formulations.

The cake mixes utilizing 42% and 55% HFCS can be made utilizing a premix product in the same manner as described in conjunction with the white cake mix made with 90% HFCS. The Emulsifier and Baking Powder Portions are then provided separately to commercial bakers to be combined with bulk ingredients which comprise the Main Portion, Shortening Portion and HFCS.

Naturally, some substitutions can be made in the ingredients, and their relative proportion, without departing from the spirit and scope of the invention. This is especially true of the more common ingredients in the non-shortening, or main, portion of the mix. For example, the fructose in examples 1–8 was provided in pure cystalline form. However, the fructose can be provided in a liquid form, such as 90% high fructose corn syrup, as utilized in examples 9–13, 42% HFCS in examples 14–18 and 55% HFCS in examples 19–22. Thus, the sweetness is provided essentially by fructose, especially in the sense that the baked cake retains its diabetic and dietetic use, characteristics and qualities. Also, whey, or other whey based products, may be used as substitutes for skim milk solids. The skim milk solids and liquid shortening can also be supplied exclusively in the Main Portion instead of wholly or partially in the emulsifier portion of the premix product. This is not preferable, however, as the skim milk solids function as a carrier for the other ingredients in the Emulsifier Portion of the premix product.

In the following examples utilizing dextrose syrup, the Main Portion, Shortening Portion and Emulsifier Portion are the same in content and proportion as in the 42% and 55% HFCS White Cake Mix, except as noted. The baking time and temperature are the same as for the 42%/55% HFCS White Cake Mix cakes, but in the mixing, 83 ml. of water was used to rinse the container of the dextrose syrup. Also, the emulsifier in the dextrose examples 23–25 was provided in liquid form, which is preferred, and mixed with the shortening before being added to the batter.

| Examples Utilizing 92% Dextrose Corn Syrup | | |
|---|---|---|
| Ingredient | Ounces | Grams |
| 92% Dextrose Corn Syrup (Royal Glucose Syrup by CPC International) | 7.5 | 212.55 |

Example 23

| Baking Powder Portion | | |
|---|---|---|
| Ingredients | Ounces | Grams |
| Sodium Bicarbonate | 0.1 | 2.834 |
| Sodium Aluminum Phosphate (acidic) | 0.1 | 2.834 |
| | 0.2 | 5.668 |

| Comments on Cake | | |
|---|---|---|
| Color: | Thick, white batter. | pH: 4.5 |

Example 23-continued

| | White cake | Sp. G. of Batter: |
|---|---|---|
| Sweetness: | Acceptable | 0.52 |
| Overall Quality: | High volume; fine, even texture with good mouth-feel. | |

Example 24

Baking Powder Portion

| Ingredients | Ounces | Grams |
|---|---|---|
| Sodium Bicarbonate | 0.1 | 2.834 |
| Sodium Aluminum Phosphate (acidic) | 0.1 | 2.834 |
| | 0.2 | 5.668 |

Comments on Cake

| Color: | Smooth, white batter. White cake. | pH: 4.5 Sp. G. of Batter: 0.68 |
|---|---|---|
| Sweetness: | Good. | |
| Overall Quality: | High volume, nice brown top with excellent texture. Good taste and mouth-feel. Very good cake. | |
| Other: | Batter beaten for two minutes at lower speed (#5 on Sunbeam Mixmaster). | |

Example 25

Baking Powder Portion

| Ingredients | Ounces | Grams |
|---|---|---|
| Potassium Bicarbonate | 0.11 | 3.0 |
| Glucono-Delta-Lactone | 0.18 | 5.0 |
| | 0.29 | 8.0 |

Comments on Cake

| Color: | White cake. | pH: 6.3 |
|---|---|---|
| Sweetness: | Mildly sweet; good | Sp. G. of Batter: .67 |
| Overall Quality: | Golden, fairly flat top. Very even and crumbly texture. Good volume. | |
| Other: | Shortening consisted of 30 gm. of Durkee's Code 321. The emulsifier portion is provided in liquid form. Also, there was no liquid shortening in the emulsifier portion. | |

There is a particularly noteworthy aspect of the dextrose sweetened cakes. In the 92% dextrose syrup, the amount of dextrose is 0.92×0.71=0.65 dry weight of dextrose per unit of liquid syrup. Thus, the ratio of the sweetener (dextrose) to the acidic component of the baking powder is considerably higher than the ratio of dry fructose to the acidic component in examples 14–22. Here, the ratio of dry dextrose to the acidic component of the baking powder ranges from about 25 (27.22 in example 25) to about 50 (49 in examples 23 and 24).

Also, the ratio by weight of the acidic component to the alkaline component in the baking powder is somewhat lower in 92% dextrose syrup sweetened cakes compared to fructose sweetened cakes.

Such ratios as low as about 1.0:1.0 produce acceptable cakes. Further, while specific examples of a cake mix have been described in detail, it is contemplated that other baked products can be readily produced with the dry mix described. These would include, but are not limited to, pancakes, waffles, doughnuts, muffins and cupcakes.

It is also noted that the shortening is provided in two forms, liquid and plastic. Essentially, the reason for this is to improve handling of the ingredients during mixing. The shortening could be provided entirely in either liquid or plastic form. However, if the shortening is in all liquid form, the mix becomes quite wet and difficult to handle. The use of some plastic shortening provides a drier, easier to handle mix. Finally, it is also contemplated that some ingredients can be provided in somewhat different form without departing from the spirit or scope of the invention. For example, skim milk could be provided in liquid form or with milk solids provided in lieu of skim milk solids. Simarly, egg whites could be provided in liquid form instead of dried egg whites.

What is claimed is:

1. In a dietetic, dry cake mix, free of artificial sweeteners and sucrose, having
   (1) a non-shortening portion comprising flour, skim milk solids, dried egg whites and a sweetener;
   (2) a shortening portion comprising a shortening, and an emulsifier;
   (3) a baking powder portion comprising an alkaline bicarbonate component and an acidic component;
   wherein the improvement comprises:
   the sweetener comprises a high fructose corn syrup wherein the dry weight of the fructose ranges from about 40% to about 60% of the dry solids;
   the acidic component of the baking powder includes glucono-delta-lactone and the ratio by weight of the acidic component to the alkaline component is greater than about 1.5:1.0;
   the dry weight of the fructose and glucono-delta-lactone are present in such portions that the ratio by weight of the fructose to the acidic component is between about 5 and about 10 so that the cake baked from batter formed when the dry cake mix is combined with water is acidic with a pH of between about 3.5 and about 6.5, has acceptable sweetness, moisture, good volume, texture, mouth-feel and shelf life.

2. The cake mix as set forth in claim 1, wherein: the cake mix is free of starch.

3. The cake mix as set forth in claim 1, wherein: the sweetener comprises 42% high fructose corn syrup.

4. The cake mix as set forth in claim 1, wherein: the sweetener comprises 55% high fructose corn syrup.

5. The cake mix as set forth in claim 1, wherein: the ratio of the emulsifier portion to the baking powder portion, by weight, is greater than about 0.4:1.0.

6. The cake mix as set forth in claim 1, wherein: the ratio of the dry weight of the fructose to the flour is less than about 0.5:1.0.

7. The cake mix as set forth in claim 1, wherein: the non-shortening portion further includes torula yeast.

8. A premix product for use with bulk ingredients to make a dietetic cake mix, free of artificial sweeteners, said bulk ingredients having
   (1) a main portion comprising flour, skim milk solids and dried egg whites;
   (2) a shortening portion comprising a shortening;
   (3) a sweetener comprising high fructose corn syrup wherein the dry weight of the fructose ranges from about 40% to about 60% of the dry solids;
   said premix product having:
   an emulsifier portion comprising propylene glycol monostearate, lactated monoglycerides; and a baking powder portion comprising an alkaline bicarbonate component and an acidic component which includes glucono-delta-lactone and the ratio by weight of the acidic component to the alkaline bicarbonate component is greater than about 1.5:1.0;

wherein the ratio of the emulsifier portion to the baking powder portion, by weight, is greater than about 0.4:1.0;

wherein the glucono-delta-lactone is present in such a portion that when the premix product is combined with the bulk ingredients, the ratio by weight of the dry weight of the fructose to the acidic component is between about 5 and about 10 so that the cake baked from batter formed when the bulk ingredients are combined with the premix product and water is acidic with a pH of between about 3.5 and about 6.5, has acceptable sweetness, good appearance, volume, moisture, texture and mouth-feel.

9. In a dietetic cake mix, free of artificial sweeteners and sucrose, having
   (1) a non-shortening portion comprising flour, milk solids, egg whites and a sweetener;
   (2) a shortening portion comprising a shortening and an emulsifier;
   (3) a baking powder portion comprising an alkaline biacarbonate component and an acidic component;
wherein the improvement comprises:

the sweetener comprises a corn derived syrup having either a dry weight of fructose which ranges up to about 60% of the dry solids or a dry weight of dextrose which ranges from about 40% to about 100% of the dry solids;

the ratio by weight of the acidic component to the alkaline component is about 1.0:1.0, or greater;

the dry weight of the sweetener and the acidic component of the baking powder are present in such portions that the ratio by weight of the sweetener to the acidic component is between about 5 and about 50 so that the cake baked from batter formed when the dry cake mix is combined with water is acidic with a pH of between about 3.5 and about 6.5, has acceptable sweetness, moisture, good volume, texture, mouth-feel and shelf life.

10. The cake mix as set forth in claim 9, wherein:
the sweetener comprises corn syrup having dextrose with a dry weight of from about 40% to about 100% of the dry solids;
the ratio by weight of the acidic component to the alkaline component ranges from about 1.0:1.0 to about 1.5:1.0.

11. The cake mix as set forth in claim 9, wherein:
the sweetener comprises high fructose corn syrup wherein the dry weight of the fructose ranges from about 40% to about 60% of the dry solids;
the ratio by weight of the acidic component to the alkaline component is greater than about 1.5:1.0.

* * * * *